(12) United States Patent
Grabli et al.

(10) Patent No.: US 11,069,135 B2
(45) Date of Patent: *Jul. 20, 2021

(54) ON-SET FACIAL PERFORMANCE CAPTURE AND TRANSFER TO A THREE-DIMENSIONAL COMPUTER-GENERATED MODEL

(71) Applicant: LUCASFILM ENTERTAINMENT COMPANY LTD., San Francisco, CA (US)

(72) Inventors: Stéphane Grabli, San Francisco, CA (US); Michael Bao, Livingston, NJ (US); Per Karefelt, London (GB); Adam Ferrall-Nunge, Oakland, CA (US); Jeffery Yost, San Francisco, CA (US); Ronald Fedkiw, Sunnyvale, CA (US); Cary Phillips, Moss Beach, CA (US); Pablo Helman, San Rafael, CA (US); Leandro Estebecorena, San Rafael, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/681,300

(22) Filed: Nov. 12, 2019

(65) Prior Publication Data

US 2020/0286284 A1    Sep. 10, 2020

Related U.S. Application Data

(60) Provisional application No. 62/814,994, filed on Mar. 7, 2019.

(51) Int. Cl.
| | | |
|---|---|---|
| G06T 17/20 | (2006.01) | |
| G06T 15/50 | (2011.01) | |
| G06T 13/40 | (2011.01) | |

(52) U.S. Cl.
CPC ............ *G06T 17/20* (2013.01); *G06T 13/40* (2013.01); *G06T 15/50* (2013.01)

(58) Field of Classification Search
CPC ......... G06T 13/40; G06T 15/50; G06T 17/20; G06T 19/20; G06T 2219/2021;
(Continued)

(56) References Cited

U.S. PATENT DOCUMENTS

| | | | | |
|---|---|---|---|---|
| 8,144,153 B1 * | 3/2012 | Sullivan | .................. | G06T 13/40 345/473 |
| 8,207,971 B1 | 6/2012 | Koperwas et al. | | |

(Continued)

FOREIGN PATENT DOCUMENTS

WO    2018053703 A1    3/2018

OTHER PUBLICATIONS

U.S. Appl. No. 16/808,110, "Notice of Allowance", dated Mar. 2, 2021, 17 pages.
(Continued)

*Primary Examiner* — Sae Won Yoon
(74) *Attorney, Agent, or Firm* — Kilpatrick Townsend & Stockton LLP

(57) ABSTRACT

A method of transferring a facial expression from a subject to a computer generated character that includes receiving a plate with an image of the subject's facial expression, a three-dimensional parameterized deformable model of the subject's face where different facial expressions of the subject can be obtained by varying values of the model parameters, a model of a camera rig used to capture the plate, and a virtual lighting model that estimates lighting
(Continued)

conditions when the image on the plate was captured. The method can solve for the facial expression in the plate by executing a deformation solver to solve for at least some parameters of the deformable model with a differentiable renderer and shape from shading techniques, using, as inputs, the three-dimensional parameterized deformable model, the model of the camera rig and the virtual lighting model over a series of iterations to infer geometry of the facial expression and generate a final facial mesh using the set of parameter values of the deformable model which result in a facial expression that closely matches the expression of the subject in the plate.

19 Claims, 5 Drawing Sheets

(58) Field of Classification Search
CPC .......... G06K 9/00214; G06K 9/00302; G06K 2209/40; H04N 5/2224
USPC ....................................................... 345/419
See application file for complete search history.

(56) References Cited

U.S. PATENT DOCUMENTS

| | | | |
|---|---|---|---|
| 9,437,034 B1* | 9/2016 | Wei | G06T 17/00 |
| 2002/0128060 A1 | 9/2002 | Belhumeur et al. | |
| 2008/0170077 A1 | 7/2008 | Sullivan et al. | |
| 2010/0134487 A1 | 6/2010 | Lai et al. | |
| 2015/0215623 A1 | 7/2015 | Sanders et al. | |
| 2015/0332127 A1* | 11/2015 | Zheng | G06K 9/6202 |
| | | | 382/165 |
| 2017/0185843 A1* | 6/2017 | Goto | G06T 7/20 |
| 2017/0301125 A1 | 10/2017 | Bouaziz et al. | |
| 2018/0033189 A1 | 2/2018 | Ma et al. | |
| 2018/0046854 A1 | 2/2018 | Kittler et al. | |
| 2018/0068178 A1 | 3/2018 | Theobalt et al. | |
| 2019/0035149 A1 | 1/2019 | Chen et al. | |
| 2019/0043252 A1 | 2/2019 | Venshtain et al. | |
| 2019/0124244 A1 | 4/2019 | Knoll et al. | |
| 2020/0013212 A1 | 1/2020 | Wang et al. | |
| 2021/0007806 A1* | 1/2021 | Karade | A61B 34/10 |

OTHER PUBLICATIONS

GB2003167.0, "Search Report", dated Aug. 20, 2020, 4 pages.
U.S. Appl. No. 16/808,110, "Non-Final Office Action", dated Nov. 24, 2020, 25 pages.
AU2020201618, "First Examination Report", dated Nov. 16, 2020, 8 pages.
Flueckiger, "Computer-Generated Characters in Avatar and Benjamin Button", Available Online at <https://www.zauberklang.ch/AvatarButtonFlueckiger.pdf>, 2011, pp. 1-28.
Jiang, et al., "3D Face Reconstruction with Geometry Details from a Single Image", Institute of Electrical and Electronics Engineers Transactions on Image Processing, vol. 27, No. 10, Oct. 2018, 14 pages.
NZ762338, "First Examination Report", dated Dec. 8, 2020, 3 pages.
Thies, et al., "Real-Time Expression Transfer for Facial Reenactment", Association for Computing Machinery Transactions on Graphics, vol. 34, No. 6, Oct. 2015, 14 pages.
Suwajanakorn, et al., "Total Moving Face Reconstruction", Presented at the European Conference on Computer Vision (ECCV), http://www.supasorn.com//eccv14_totalmoving.pdf, Sep. 4, 2014, 17 pages.

* cited by examiner

ON-SET FACIAL PERFORMANCE CAPTURE AND TRANSFER TO A THREE-DIMENSIONAL COMPUTER-GENERATED MODEL

CROSS-REFERENCES TO RELATED APPLICATIONS

This application claims the benefit of U.S. Patent Application No. 62/814,994, filed Mar. 7, 2019. The disclosure of which is incorporated by reference herein in its entirety for all purposes.

FIELD

The present disclosure relates generally to performance capture, and more specifically to methods, techniques and systems for capturing facial expressions from a subject during a performance and transferring the captured expressions to a three-dimensional model of the subject.

BACKGROUND OF THE INVENTION

Facial expression transfer is the act of adapting the facial expressions of a subject, such as an actor, to a three-dimensional computer-generated (CG) model that can be used to create visual effects that can then be incorporated into animations, movies, video games and the like. Mastering facial expression transfer and other aspects of facial animation is a long-standing challenge in computer graphics. The face can describe the emotions of a character, convey their state of mind, and hint at their future actions. Audiences are particularly trained to look at faces and identify these subtle characteristics. Accurately capturing the shape and motion of real human faces in the expression transfer process can play an important role in transferring subtle facial expressions of the subject to a computer-generated character giving the computer-generated character natural, life-like expressions.

In order to transfer facial expressions from a subject to a computer-generated model, the subject's facial expressions first have to be captured, for example, on digital film or another appropriate medium. Some traditional techniques that are used to capture facial expressions of a subject (e.g., of an actor during a performance) rely on numerous markers positioned at strategic locations on an actor's face and a head-mounted, high-resolution camera that is directed towards the actor's face. The camera can then be used to film the actor's face during his or her performance. Software can track movement of the markers as the actor's face displays different expressions during the performance and translate the marker movement into a computer-generated model that mimics the actor's facial expressions.

While such techniques have been successfully used in a variety of different situations including in various well-known movies, it can be cumbersome and distracting to actors to wear a head-mounted camera during a performance and to have their faces covered with dozens of markers.

SUMMARY OF THE INVENTION

Embodiments of the disclosure pertain to methods and systems for capturing the facial expressions of an actor or other subject without the use of a head-mounted camera and in film set conditions. The captured facial expressions can be transferred to a three-dimensional parametrized deformable model of the actor or subject and used to in the context of visual effects production, including but not limited to, animations, movies, video clips, video games, and virtual and/or augmented reality content. In some embodiments the method iteratively deforms a three-dimensional mesh with the goal to minimize the difference between a 3D render of that mesh and the plate (i.e., a frame from the captured footage). A differentiable renderer can be used to generate the 3D face renders making it possible to leverage well-known derivative-based minimization techniques to meet the goal.

Some embodiments of the invention provide a method of transferring a facial expression from a subject to a computer generated character. The method includes receiving a plate with an image of the subject's facial expression, a three-dimensional parameterized deformable model of the subject's face where different facial expressions of the subject can be obtained by varying values of the model parameters, a model of a camera rig used to capture the plate, and a virtual lighting model that estimates lighting conditions when the image on the plate was captured. The method can solve for the facial expression in the plate by executing a deformation solver to solve for at least some parameters of the deformable model with a differentiable renderer and shape from shading techniques, using, as inputs, the three-dimensional parameterized deformable model, the model of the camera rig and the virtual lighting model over a series of iterations to infer geometry of the facial expression and generate a final facial mesh using the set of parameter values of the deformable model which result in a facial expression that closely matches the expression of the subject in the plate.

In some embodiments the three-dimensional parameterized deformable model can include a plurality of blendshapes that represent different facial expressions of the subject and include a set of blendshape weight values, one per blendshape. The final facial mesh is obtained by choosing a set of weighted blendshapes that best mimic the facial expression in the plate. In various embodiments the deformable model can also include rotation and translation values that represent a rigid adjustment of the subject's head as well as a delta vector that represents a per vertex displacement used in transferring the facial expression of the subject to the computer-generated character, which can be particularly useful where the computer-generated character has a head sized or shaped differently than the head of the subject.

In some embodiments the plate can be an image made up of thousands or even more than a million pixels. Each pixel can have a particular RGB value. During each iteration of the series of iterations the differentiable renderer can generate a rendering of the deformable model and a solver can then try to minimize differences between the RGB values of the plate and the RGB values of corresponding pixels in the rendered version of the deformable model. An initial iteration of the solving can include: rendering an initial facial mesh generated from the three-dimensional deformable model representing a neutral expression of the subject; trying to minimize differences between RGB values of the plate and RGB values of the rendered initial facial mesh representing the neutral expression; and generating an updated facial mesh including a set of weighted blendshapes that represents a facial expression of the subject that is more similar to the facial expression of the subject in the plate than is the initial facial mesh. In each additional iteration of the solving step, an output of that iteration can be generated that is closer to the actual representation of the subject in the plate than an output of the previous iteration.

In some embodiments, solving for the facial expression in the plate can include executing a plurality of different solvers where each solver executes multiple iterations before the next solver is run and where each solver has at least one cost function associated with it that defines an objective that the solver tries to minimize. The plurality of different solvers can be executed in a predetermined sequence that is defined by a recipe selected from a library that stores multiple predetermined recipes. Each predetermined recipe in the library can include one or more deformation solvers each of which has at least one cost function associated with it.

In additional embodiments, a method of transferring a facial expression from a subject during a performance to a computer generated character can include obtaining at least: (i) digital video footage of the performance in the format of a plurality of sequentially ordered plates each of which includes an image of the subject's facial expression during the performance; (ii) a three-dimensional parameterized deformable model of the subject's face where different facial expressions of the subject can be obtained by varying the values of the model parameters; (iii) a model of a camera rig used to capture the performance; and (iv) a virtual lighting model that estimates lighting conditions used during the performance. The method can further include generating a computer model of the performance by, for each individual plate in the plurality of sequentially ordered plates, processing the individual plate independently of other plates in the plurality to solve for the facial expression in the plate being processed using a differential renderer with shape from shading techniques over a series of iterations to infer geometry of the facial expression and generate a final facial mesh using the set of parameter values for the deformable model which result in a facial expression that closely matches the expression of the subject in the plate being processed where the solving uses the three-dimensional deformable model, the camera rig and the virtual lighting model as inputs.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF SPECIFIC EMBODIMENTS

Embodiments of the invention pertain to methods and systems for capturing the facial expressions of an actor or other subject during a performance without the use of a head-mounted camera and in film set conditions allowing the actor to have full freedom of motion and full freedom of interaction with the others actors and with the set. In this manner, embodiments of the invention enable film-production quality facial motion capture with as little encumberment as possible for the actor so as to not compromise his or her performance. Embodiments also impose as little restriction as possible on the on-set filming conditions, e.g. location, illumination conditions, camera models and settings, and the like.

Once captured, embodiments of the invention further pertain to transferring the captured facial expressions to a three-dimensional parameterized deformable model of the actor that can be used in the context of visual effects production. In some embodiments the method iteratively deforms a three-dimensional mesh with the goal to minimize the difference between a 3D render of that mesh and the plate (i.e., a frame from the captured footage). A differentiable renderer can be used by itself or in conjunction with other elements to generate the 3D face renders making it possible to leverage well-known derivative-based minimization techniques to meet the goal.

Example Performance Environment

Figure 1:
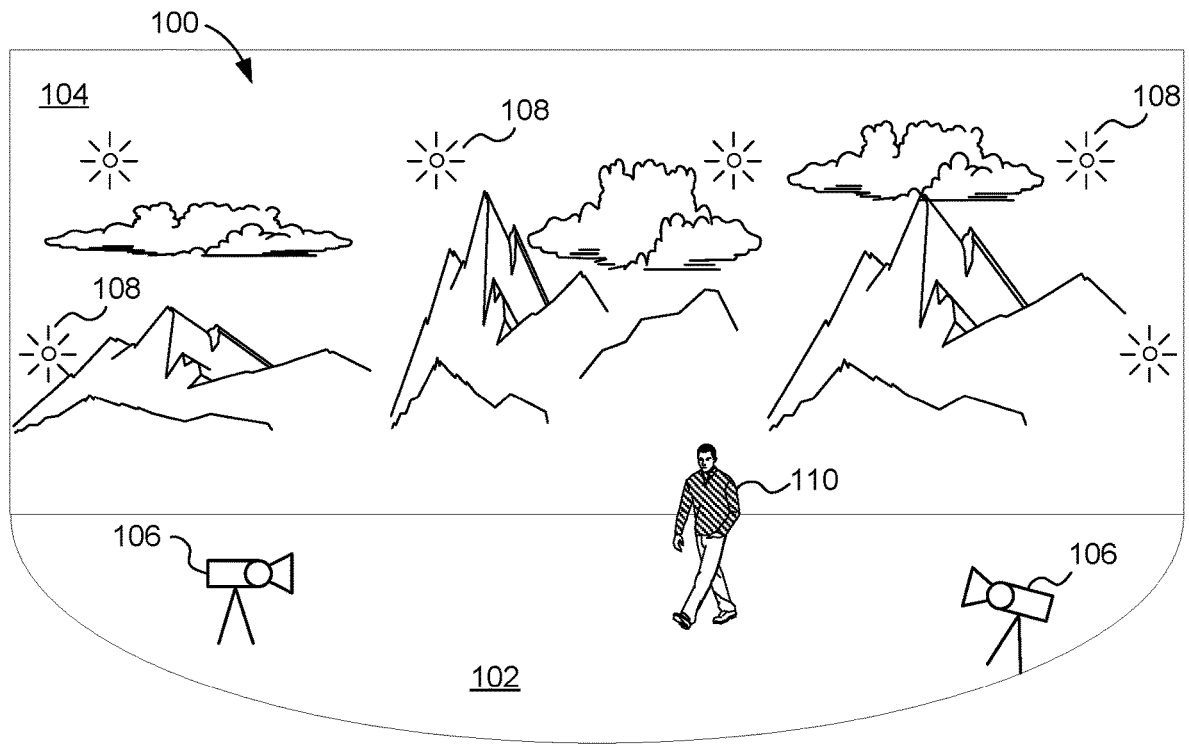
FIG. 1 is a simplified diagram of an exemplary environment in which embodiments of the present invention can be employed.

In order to better understand and appreciate embodiments of the invention, reference is made below to FIG. 1, which is a simplified diagram of an exemplary environment 100 in which embodiments of the present invention can be employed. Environment 100 can include a performance area 102 and a backdrop 104. Performance area 102 can be a stage or any area in which one or more actors can carry out a performance. Backdrop 104 can be a green screen that facilitates post-production work or can include scenery that is appropriate for the performance. For example and solely for illustrative purposes, in FIG. 1 backdrop 104 is an outdoor scene that includes mountains and clouds. In some embodiments, some or all of the scenery of backdrop 104 can be generated on a computer and displayed on one or more displays, such as large LCD or LED displays, that surround performance area 102.

One or more cameras 106 can be positioned at strategic locations (e.g., locations that help with the capture and/or locations that are desirable for the director cinematically) within environment 100 to capture the performance of an actor 110. Additionally, one or more lights, for example LED lights, can be placed around stage 102 in order to project visible light onto the stage to accomplish desired lighting effects for the performance.

Embodiments of the invention can be used with a variety of different cameras and are not limited to any number of cameras or to any particular camera type. For the purpose of facial motion capture, some embodiments can include a camera system that includes at least two different types of cameras. For example, in some embodiments each camera 106 (or a subset of cameras 106) can include a first camera that is set up and configured to capture images of an actor in the visible light wavelength spectrum and one or more second cameras that are set up and configured to capture images of a small set of markers placed on the actor's face in an invisible light wavelength spectrum, e.g., infrared (IR) or ultraviolet (UV) light wavelength spectrum. The first camera is sometimes referred to herein as a "taking camera" and the second cameras are sometimes referred to a "witness cameras". It is to be appreciated that the words "visible" and "invisible" used herein are to be interpreted in relation to what is detectable by the naked eye. By being configured to capture light in different spectrums, the taking camera and the one or more witness cameras can simultaneously capture different aspects of a scene based on their respective light wavelengths, thereby eliminating the need to capture two separate performances of the same scene to generate content.

Example Camera System

An example of a camera system that can be used as one or more of the cameras 106 is discussed in U.S. patent application Ser. No. 16/102,556 ("the '556 application"), filed on Aug. 13, 2018 and entitled "Camera Systems for Motion Capture". The '556 application published on Apr. 25, 2019 as U.S. Publication 2019-0124244 and is incorporated herein by reference in its entirety. For convenience, an abbreviated description of an example of a camera system described in the '556 application is also depicted in FIG. 2, which is a simplified diagram of an exemplary configuration of a camera system 200 that can be used for facial performance capture according to some embodiments of the invention.

Figure 2:
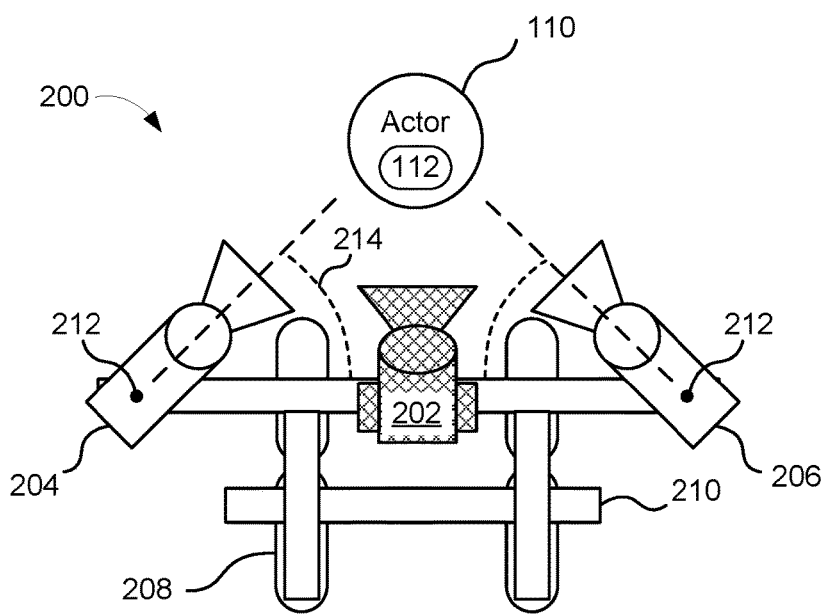
FIG. 2 is a simplified diagram of an exemplary configuration of a camera system that can be used for facial performance capture according to some embodiments of the invention.

As shown in FIG. 2, camera system 200 can include a taking camera 202 along with two infrared (IR) witness cameras 204, 206 positioned on opposite sides of the taking camera. In some embodiments the cameras can all be mounted to a moveable rig 210 and can be pointing in the same general direction such that all three cameras can capture the same scene but at different angles. Rig 210 can include wheels 208 that enable the rig to be easily moved around performance area 102 to capture different angles of an actor 110. In some embodiments, witness cameras 204, 206 can be rotated around respective pivot points 212 so that witness cameras can be positioned at different angles with respect to support structure 305. For instance, as shown in FIG. 2 when actor 110 is positioned close to camera system 200, witness cameras 204, 206 can each be pivoted around respective pivot points 212 and be oriented at appropriate angles 214 so that the witness cameras are pointed at actor 110. On the other hand, when actor 110 is positioned further away from camera system 200, the witness cameras can be oriented at an increased angle 214 to actor 110.

A band-pass filter (not shown) can be mounted on each IR camera 204, 206 such that each IR camera only captures a narrow spectrum in the IR domain. Additionally, each IR camera can be fitted with an "IR ring-shaped light" (not shown) made of a set of IR LEDs emitting in the desired spectrum. The light emitted by these rings is invisible to main camera 202 but produces a consistent "flat" illumination for IR cameras 204, 206—a type of imagery that is friendlier to computer processing. Finally, the type of shading produced by these rings on the face is highly predictable since the light types and positions are precisely known, which can be used to solve for facial deformation based on shading observed on the plate by the witness camera. Other embodiments of camera system 200 do not require the witness cameras 204, 206 to be IR cameras and can instead employ witness cameras that use a different spectra, but IR cameras can make the data captured relatively easy to process.

On-set Facial Performance Capture and Transfer

Figure 3:
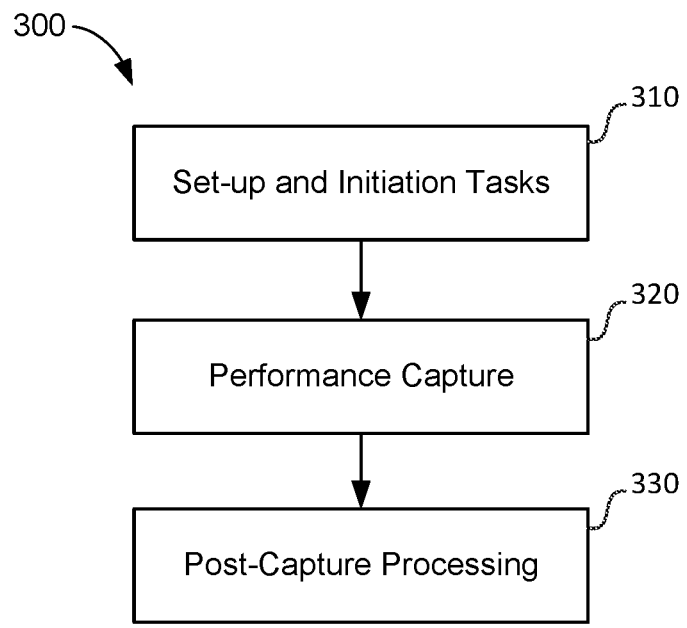
FIG. 3 is a simplified flowchart depicting a facial performance capture and expression transfer method according to some embodiments of the invention.

Embodiments of the invention and operation of camera system 200 can be better understood from an exemplary use case scenario described with respect to FIG. 3, which is a simplified flowchart depicting an on-set facial performance capture and transfer method 300 according to some embodiments of the invention. For example, unlike when capturing and transferring a facial performance from archival footage, on-set facial motion capture and transfer process 300 allows for access to the actors, the cameras and the set as part of a set-up and/or initiation tasks (step 310). Such initiation tasks can be performed prior to filming a motion picture or other video sequence. For example, the actor's face can be "scanned" in a few predetermined positions through image-based multi-view stereo techniques, the actor's face reflectance properties (e.g. a diffuse color map) can be measured; the set or performance area (e.g., area 102) can be scanned and measured (e.g., by scanning the set with a LIDAR unit); lenses for the taking and witness cameras can be selected based on the conditions of the set along with appropriate aperture, ISO and other settings; distortion for the lenses used in camera system 200 can be measured and estimates of the camera's intrinsic and extrinsic parameters can be made using known calibration techniques and known approaches to calibrating color; lighting for the set and cameras can be adjusted as appropriate; and the on-set illumination can be captured for each different lighting configuration that will be used during the shoot (e.g., by capturing a stereo pair of HDRI light probes in key locations, such as where the actor(s) will stand). Additionally, sensors can be placed at various locations on set to gather useful information for the reconstruction, most commonly in the form of the witness cameras 204, 206.

Deformation Model

Step 310 can also include building a facial rig for each actor. The facial rig can be a three-dimensional parameterized deformable model of the actor's face. Parameters of the deformable model can be varied to generate different facial expressions of the actor allowing the deformable model to be manipulated to mimic the actor's facial expressions. Building the facial rig typically involves "scanning" the actor's geometry in a set of predetermined poses. For example, some embodiments can use Disney Research's Medusa system to do the capture and rely on artists to clean up the capture result into a usable film-quality facial rig. In some embodiments, the facial rig can be made of a simple set of linear blendshapes as described generally in U.S. Pat. No. 8,207,971, entitled "Controlling Animated Character Expressions", which is incorporated by reference herein in its entirety. Other embodiments of the invention also support solving for a more complex rig with rotational-translational joints and skinning as well as arbitrary functional mapping between rig controls and final blend shape weights.

Embodiments of the invention are not limited to deformable models based on blendshapes. For example, in other embodiments the three-dimensional parameterized deformable model can be made purely of per-vertex displacements. In still other embodiments, more sophisticated models that rely on per-patch deformation and don't use blendshapes in the traditional sense of the term can be used. In various embodiments, different facial expressions can be attained by setting different parameter values for the deformable model. For example, for a three-dimensional parameterized deformable model based on blendshapes, different facial expressions can be attained from a linear combination of a selected set of facial expressions (i.e., blendshapes) from the facial rig. By adjusting one or more parameters associated with the linear combination, a range of facial expressions can be created while utilizing relatively small amounts of computational resources.

As an example, some embodiments of the invention use a deformation function that produces a facial expression mesh M by combining linearly a set of m three-dimensional blendshapes $B_0, B_1, B_2, \ldots B_m$, where each $B_j$ is made of n vertices and represents a predefined canonical expression (e.g., inspired from Facial Action Coding System (FACS) shapes), where $B_0$ is the neutral expression, and where per-vertex displacements $\delta$ are added. A rotation R and translation t can also be applied to the resulting geometry. Thus, the deformation for a vertex of index i can be as follows:

$$M(i)^T = \left[ B_o(i) + \sum_{j=1}^{m} w_j(B_j(i) - B_o(i)) + \delta(i) \right]^T \cdot R + t \quad (1)$$

where the $w_j$ are the blend shape weights, i.e. the weights used to combine the blend shapes linearly. The rotation R, the translation t, the blendshape weights wj and the per-vertex displacements $\delta(i)$ are the parameters of the deformable model.

This deformation is versatile in the sense that it incorporates both a strong prior in the form of blend shapes and a less constrained deformation component through the deltas (per-vertex 3D displacements), which enables expressions to be matched which, expectedly, go beyond the abilities of the shapes alone. Some embodiments also support more complex facial rigs and deformation functions which include rotational and/or translational joints and skinning (e.g., for the jaw) in addition to blendshapes and deltas. Some embodiments also support arbitrary functional mapping between a set of user-facing controls and final shape (or joint) weights.

Referring again to step 310, the director or other party planning the performance capture (e.g., a Director of Photography) can also select various configurations for the cameras 106 to be used in the capture session including the type of camera and lens used in the shoot for each camera 106 (or where a camera 106 is a system including both taking and witness cameras, the type of camera and lens used with each such camera in the system), the settings on the camera(s), luminosity levels, etc. In some embodiments all cameras are jam-synchronized but other embodiments are able to work with systems where only time code-synchronization is available between the main camera and the witness cameras. In some embodiments, the witness cameras can be set to a short exposure time to limit the amount of motion blur in witness camera images.

As mentioned above, in some embodiments, a small number of markers (e.g., the markers can be applied to two, three, six, eight, or more points on an actor's face) can be positioned on an actor's face to assist in the motion capture process as described in U.S. patent application Ser. No. 16/102,556, which as noted above is incorporated by reference herein. The markers can be positioned on substantially rigid parts of an actor's face to minimize distortion caused by facial movement during a performance. The markers enable motion capture of the actor's skull as he or she is performing and can also be used for deformation tracking as well. The data generated from tracking the markers can be used for determining rotation and translation of the actor's skull in each plate as opposed to being used for tracking movements in the actor's facial expressions in accordance with some traditional techniques as mentioned in the Background of the Invention section above.

Figure 4:
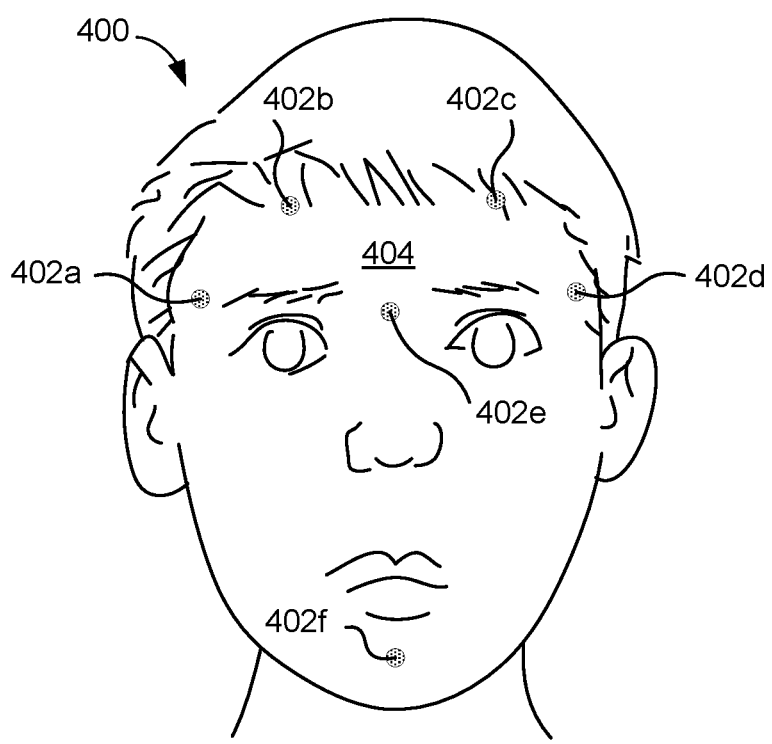
FIG. 4 is a simplified illustration of exemplary positions for small set of gel-based markers that enable motion capture of the skull of an actor during a performance according to some embodiments of the invention.

FIG. 4 is a simplified illustration 400 of exemplary positions for markers 402a-g that enable motion capture of the skull of an actor 404 during a performance according to some embodiments of the present disclosure. As shown in FIG. 4, markers 402a and 402d can be positioned at the temples of actor 404, markers 402b and 402c can be positioned along the hairline of actor 404, marker 402e can be positioned on the nose bridge, and marker 402f can be positioned on the chin of actor 404. These positions are selected because they are generally substantially free of movement caused by facial expressions and/or talking. That way, the positions can closely track the movement of the skull of actor 404. By tracking these positions, the witness cameras can more accurately capture the movement of the actor's head.

In some embodiments the markers can be retroreflective gel-based markers that reflect the invisible light (e.g., IR or UV light in the bandwidth captured by the witness cameras) but are not visible to the taking camera as there is generally no visible light emitted near the optical axis of the taking camera. The markers gel-based markers can be applied to an actor's face as if it were makeup. As a retroreflective substance, each marker, when applied to an actor's face, can act as a surface that reflects light back to its source with a minimum of scattering along a vector that is parallel but opposite in direction from the light's source. By being retroreflective, each marker can effectively negate any noise from ambient light. For instance, under normal lighting conditions indoors (i.e., absent lights directly beaming at the markers), the markers may not be visible or have negligible visibility. For instances where a set is positioned outside, the sun can emit vast amounts of IR light. However, because the markers are retroreflective, the IR light emitted from the sun may not reflect back to the witness cameras. Instead, only the IR light emitted from the witness camera light sources (e.g., ring of IR LEDs around the witness cameras' lenses) will get reflected back to the witness cameras. Thus, even though a taking camera and one or more witness cameras are filming an actor with markers 402a-g, only the witness cameras will capture the markers.

By having two types of cameras 202 and 204, 206 with their respective light sources and applying markers that are only visible to witness cameras and not a taking camera, camera system 200 can effectively and efficiently capture two different motion picture compositions with one shoot, i.e., act of filming. Thus, with a single performance by actor 110, camera system 200 can capture images that are directly usable: (1) for an item of content (e.g., content that can be used in cinematic footage) and/or driving a digital character in a virtual environment. and (2) for accurately determining the location of a digital character mapped to the head of actor 110 in a virtual environment.

Capturing the Performance

After set-up and initiation tasks have been completed, camera system 200 can be used to capture the entire composition of a set, such as set 100, during a performance (FIG. 3, step 320). For example, the taking camera 202 can be used to film actor 110 during a performance in which the actor is surrounded by a backdrop of rural mountains. Light sources 108 can be flood lights shining white, visible light that illuminates the scene with visible light so that taking camera 202 can capture footage of actor 110 as he or she looks around, as well as any extras present in the scene and props, such as farm equipment that may be near the actor. Meanwhile, the IR lights associated with witness cameras 204, 206 can project onto the scene invisible, IR light so that witness cameras can simultaneously capture footage of markers 112 (which as discussed in more detail herein be configured as a retro-reflectors that can substantially reflect IR light) on the face of actor 110. Accordingly, the markers may appear as bright dots in the images captured by witness cameras 204, 206.

Because taking camera 202 is generally unable to detect IR light, the images captured by taking camera 202 will likely not include portions of reflected IR light from markers 112. As a result, the images captured by taking camera 202 can be used directly in an item of content (e.g., as footage in a movie) and/or used to drive a digital replica of actor 110 based on a markerless motion solving system. In some embodiments, markers 112 can be detectable in both visible and invisible light spectrums. For instance, markers 112 can be black dots that are detectable in both visible light and IR light. In such instances, taking camera 202 and witness cameras 204, 206 can both capture the positions of markers 112, thereby enabling a more robust triangulation of the face of actor 110 during the performance.

Once the desired facial motion capture footage has been obtained, the footage can be used to generate a computer model of the performance thereby transferring the captured movement of the actor during the performance, including the actor's facial expressions, to a three-dimensional model of the subject. The three-dimensional model can, in turn, be used to create visual effects that can be incorporated into animations, movies, video games and the like (FIG. 3, step 330). A number of different inputs and data sets can be used to solve for the actor's performance, i.e., to identify and transfer the facial expressions of the actor to those of a three-dimensional computer model. Some of the models and/or data that can be used to solve the performance can be built or otherwise compiled or created independent of the performance and thus can be done either before, during or after step 320. Other inputs that are used to solve for the performance (e.g., the tracked location of markers 402a-g during the performance) are created based on the performance itself and thus can be generated either during performance 320 or after the performance.

Transferring the Captured Performance to a Computer-Generated Model

Figure 5A:
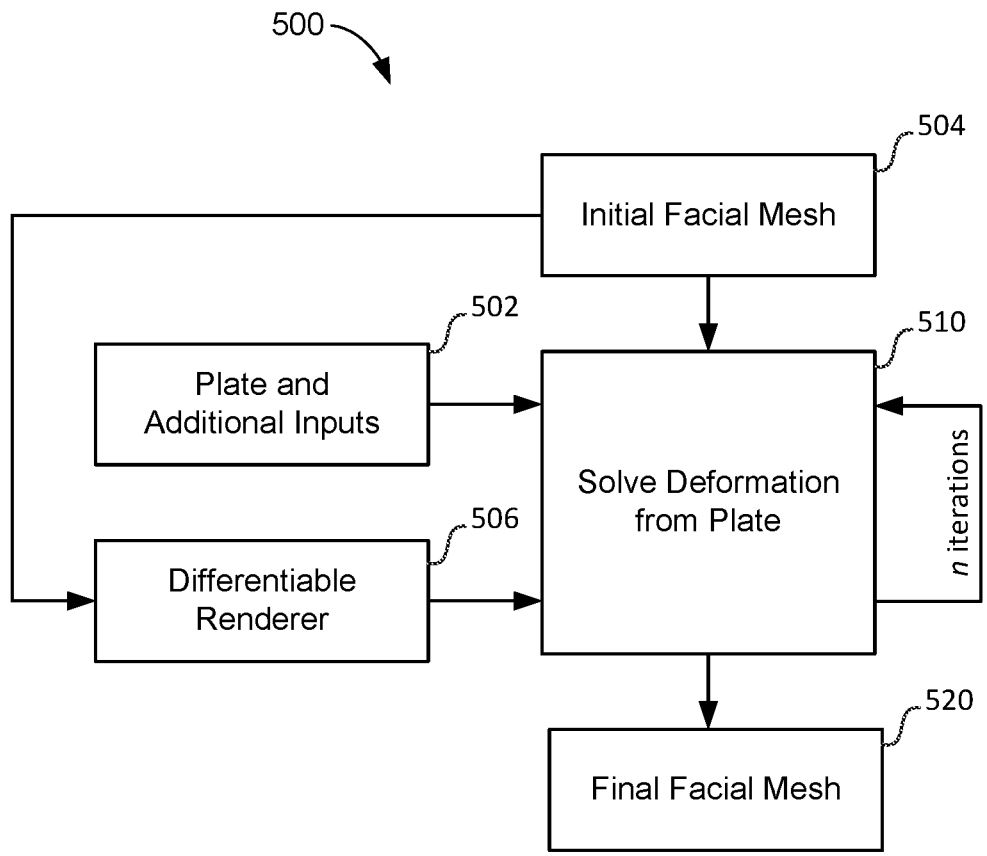
FIG. 5A is a simplified flowchart of steps associated with matching facial expressions of an actor captured during a performance to facial expressions of a computer-generated model of the actor according to some embodiments of the invention.
Figure 5B:
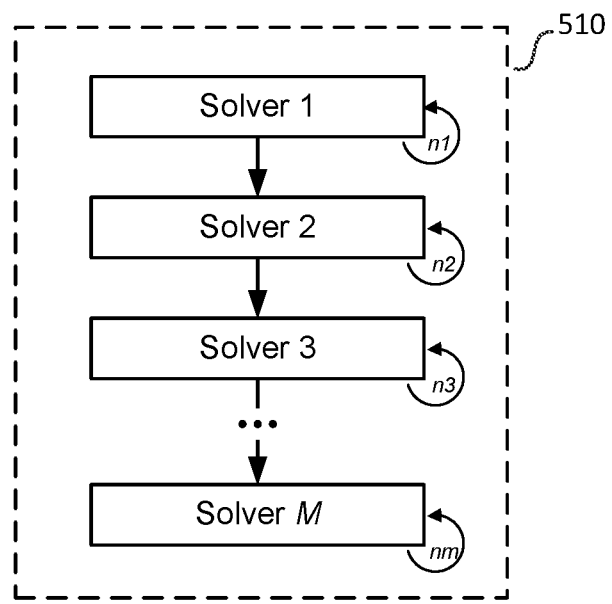
FIG. 5B is a simplified block diagram of an exemplary recipe that can be executed in block 510 of the method shown in FIG. 5A according to some embodiments of the invention.

FIG. 5 is a simplified flowchart of a method 500 of post-capture processing that can be performed as part of step 330 according to some embodiments of the invention. Method 500 can match facial expressions of an actor captured during a performance (e.g., step 320) to facial expressions of a computer-generated model of the actor. Method 500 can be performed on each and every plate in a sequence of video so that the facial expressions of a computer-generated model of the actor matches the facial expressions of the actor throughout the entire video sequence. In some embodiments method 500 can be performed such that each plate in the sequence of video frames can be processed independently without depending on the processing or solving of one or more previous plates. Thus, some embodiments of the method 500 allow each plate of a filmed video sequence to be processed in parallel taking advantage of the parallelization offered by computer clusters.

For each plate processed on a plate-by-plate basis, method 500 can start with various inputs including a plate from the performance capture session (block 502) and an initial facial mesh (block 504) representing a neutral geometry of a deformable model generated, for example, as described above with respect to FIG. 3, step 310. The initial facial mesh (i.e., initial deformable model) can include the rigid adjustment (rotation and translation), the blend shape weights and the per-vertex deltas for the deformable model that define the neutral geometry. A differentiable renderer (block 506) can render the initial facial mesh and then method 500 can solve the deformation from the plate (block 510) by trying to minimize the differences between the initial deformable model (i.e., neutral expression) and the actor's actual facial expression in the plate using a recipe (i.e., a sequence of deformation solvers as discussed below) based on various inputs as described below over a series of n iterations. Thus, the solver in block 510 calculates an expression of the deformable model that is closest to the expression of the actor in the plate.

Each of the n iterations involved with solving the deformation in block 510 generates a revised version of the deformable model (i.e., updated values for the parameters of the deformable model) that changes in each iteration from the initial neutral expression of block 504 to an expression that comes closer and closer to resembling the actor's actual facial expression in the plate. The plate can be an image made up of millions of pixels where each pixel has a particular RGB value. In each iteration, block 510 uses the differential renderer (block 506) to generate a rendering of the deformable model for the particular iteration along with derivatives. The differentiable render is an image made up of pixels and, having access to derivatives of pixel color values with respect to parameters of the model generated by the differentiable renderer, the solver tries to minimize the differences between the RGB values of the plate and the RGB values of corresponding pixels in the rendered version of the deformable model. In each iteration the output of the solver (block 510) will get closer and closer to the actual expression of the actor in the plate until the final iteration produces a final facial mesh (block 520) in which the parameters of the deformable model (e.g., the various weights of the blendshapes and the values of the rigid rotation, translation and the per-vertex displacements) result in a facial expression that very closely matches the expression of the actor in the plate. Since embodiments of the invention provide the solver with a very dense set of pixels in each iteration, the solver can produce a more detailed solution for the performance compared to solutions calculated by traditional marker-based systems that are limited in the detail they capture by the number of markers being tracked.

Inputs for the Transferring Process

When solving the deformation in block 510, embodiments of the invention can use some or all of the following inputs (block 502) in addition to the footage of the actor whose facial expressions are being captured (i.e., the plate also in block 502):

1) A facial rig of the actor which includes a 3D mesh of the actor's face with neutral expression and a set of canonical expressions also represented as 3D meshes (also known as blend shapes). The facial rig can be made up of the following components and can be built as described above: a three-dimensional mesh $B_0$ of the face in a neutral pose comprising n vertices, and a set of m three-dimensional meshes $B_1, B_2, \ldots B_m$, where each $B_j$ is made of n vertices and represents a predefined canonical expression (e.g., inspired from Facial Action Coding System (FACS) shapes).
2) The camera rig—calibrated and match-moved as described below.
3) A small set (e.g., 4-8) of 2D markers chosen on as rigid as possible places of the face and tracked throughout the footage as described above and/or a set of virtual landmarks can be added to the face in various predetermined locations using known calculation techniques.
4) The rigid motion of the 3D facial mesh throughout the footage, i.e. an estimate of the rotational and translational components of the head for each frame. The IR dots visible in the witness cameras can be used to triangulate the positions of these markers in 3D and solve for the rigid head motion which best satisfies the 3D dot positions at every frame. While this rigid motion is not expected to be perfectly accurate, it can be refined later during facial capture.
5) A hand-matched pose for a reference frame—i.e. for one of the frames of the footage an artist manually dials in facial rig controls to best match the expression from the plate. In the case of strong head rotation, it can be useful to produce two or three reference frames rather than one to improve the albedo and lighting estimate (described below). This pose matching can also be done automatically (albeit more approximately) leveraging machine-learning-based virtual facial landmarks.
6) A virtual light rig built as described below.
7) Flattened rotoscoping splines and masks as described below.
8) The albedo measured on the light stage.

Some of the above inputs can be generated from data processed on a per-shot (i.e., a continuous sequence of frames of digital film) basis as opposed to a per-plate basis. For example, for each shot, one or more of the following can be done, several of which can be required for lighting of the final frame and shared with the lighting department:

1) A virtual light rig can be built by, for example: stitching the HDRI light probes into lat-long images; using stereo multi-view geometry, turn the key lights in the HDRI probes into actual virtual lights (e.g., rectangular area lights); and using the gray sphere, chrome sphere and/or McBeth chart, adjust light intensities and colors.
2) Match move the camera rig by, for example, using footage of calibration devices, solving for camera intrinsic and extrinsic parameters and the relative transformations between the main camera and the witness cameras. And, using standard match-moving techniques (markers on set, etc.), solving for the rig transformation matrix during the shot.
3) Rotoscoping splines by, for example, drawing eye lid and outer lip splines as view-independent splines (i.e., that are "drawn" on the mesh) and inner lip view-dependent splines (i.e., which delineate the occluding contours of the inner lips). Rotoscoping splines can be replaced by machine-learning based facial virtual landmarks if desired.
4) Rotoscoping shapes by, for example, drawing shapes to define occluding masks—any object which occludes the face at any point during a shot can be drawn as a closed 2D shape.
5) Flatten all two-dimensional elements by, for example, using the lens distortion measurements done earlier. The lens distortion as an image-space map can be inverted and applied to the 2D elements (such as the plate, the rotoscoping splines, occluding masks etc).
6) Model occluding geometry by, for example, for any object that casts a significant shadow on the actor's face, a 3D mesh can be produced that approximates the occluding geometry.

Embodiments of the invention can solve for the performance in block 510 with a differentiable renderer based on some or all of the above inputs using appearance and/or shading to infer geometry as opposed to using a standard VFX rendering system. For example, some embodiments can employ shape from shading techniques that can leverage gradient patterns on the image to provide clues as to what the actor's face is doing at the time the image was taken and use the gradient patterns to estimate what deformation the actor's face is doing based on the image.

A simplified shading model can accommodate the differentiability constraints imposed by an optimization framework while maintaining acceptable performances. In some embodiments the surface reflectance model can be a simple diffuse Lambertian model and four types of lights can be supported, including: environment light, rectangular area light, directional light and point light. Embodiments can represent the environmental illumination using a second order Spherical Harmonics basis representation (i.e. nine components) or a higher order basis representation.

All lights can be initialized using the light rig measured on set. In particular, the Spherical Harmonics components of the environment light can be initialized by projecting the HDRI measured on set onto the Spherical Harmonics basis. For rectangular area lights, the light geometry can be known from the stereo pair of HDRI images (and potentially with the help of the scan). Their emission color can be approximated by averaging the full emission texture as photographed on set. Directional lights can be used to model illumination from the sun, and point lights can occasionally be used as a cheaper approximation for finite size lights which are far away from the subject.

For all these lights, irradiance can be computed analytically using closed-form differentiable expressions, as described further. Shadows can be approximated using stochastic Monte-Carlo integration and multiplied with the unshadowed irradiance to get the final reflected radiance. While this approximation may not be entirely correct (taking the visibility term outside of the rendering integral), it is often good enough for the purpose it is required for and makes the approach practical.

For the environment light, efficiency can be improved by computing a visibility term V as the proportion of samples for which the environment is unoccluded, where the light samples are importance-sampled according to the energy defined by the Spherical Harmonics components. For rectangular area lights, samples on the light geometry can be distributed and, again, the proportion of occluded shadow rays against the full set of samples drawn can be computed. Shadowing for directional and point lights can also be done. Note that, in some embodiments, the visibility term is not easily differentiable and can be considered a constant term in the optimization. Its value can be updated at every step of the iterative solve.

In some embodiments the model includes an albedo term a represented as an RGB color for each vertex of the mesh. The albedo value at an arbitrary point on the surface of the mesh can be obtained through barycentric interpolation of the albedo at the triangle vertices where the point lies. With this model, the radiance $L_{env}$ scattering off a 3D point p of normal n on the mesh under an illumination defined by the Spherical Harmonics components $\{L_{lm}\}$, $l \in \{0,1,2\}$, $m \in \{-l, -l+1, \ldots, l-1, l\}$ and with visbility V is:

$$L_{env}(p) = \alpha(p)V(p)\sum_{l=0}^{2}\sum_{m=-l}^{l}\sqrt{\frac{4\pi}{2l+1}}k_{lm}L_{lm}Y_{lm}(n) \quad (2)$$

Where $\{k_{lm}\}$ is the set of nine Spherical Harmonics components for the clamped cosine and $\{Y_{lm}(n)\}$ is the set made of the first nine Spherical Harmonics basis functions evaluated in the direction defined by the surface normal n at the shading point.

The radiance $L_{rect}$ reflected off p due to illumination by a rectangular area light of constant radiance L is:

$$L_{rect}(p) = -n \cdot \left(\alpha(p)V(p)\frac{L}{2\pi}\sum_{i=0}^{3}\Theta_i(p)\Gamma_i(p)\right) \quad (3)$$

With:

$$\Theta_i(p) = \cos^{-1}\left(\frac{v_i - p}{\|v_i - p\|} \cdot \frac{v_{i+1} - p}{\|v_{i+1} - p\|}\right) \quad (4)$$

$$\Gamma_i(p) = \frac{(v_i - p) \times (v_{i+1} - p)}{\|(v_i - p) \times (v_{i+1} - p)\|} \quad (5)$$

Where the $v_i$ are the vertices of the rectangular light.

While some real-world objects would not be well approximated by this simplified shading model, it works well enough for faces thanks to the mostly diffuse nature of human skin.

In some embodiments, a version of the shading model can also include a specular term, modeled as Blinn-Phong lobe.

As stated above, block 510 can try to minimize the differences between the deformable model and the actor's facial expression in the plate using multiple approaches or "solvers" based on the inputs from block 502. Each solver can execute one or more iterations (e.g., n iterations). The types of solvers used in block 510 and the number of iterations that each solver is executed can be chosen prior to implementing method 500. For example, in some embodiments, particular solvers can include between 10-15 iterations but embodiments of the invention are not limited to any particular number of iterations, however, and a user can choose more or fewer iterations as is deemed appropriate for each solver to reach an acceptable level of matching between the deformable model generated as the final facial mesh (block 520) and the original plate.

To provide maximum versatility, some embodiments provide a node-based application for maximum versatility. Indeed, the variety of configurations seen throughout different shots can benefit from selecting different approaches to solve the different shots. Towards this end, in some embodiments a set of basic recipes is provided that can be presented to the artist as templates to follow for solving a given shot (e.g., a sequence of images of the performance captured under the same general lighting conditions). The recipes can be stored in a database library (e.g., library 620 shown in FIG. 6) and can be made of a small set of building blocks which can be split into two main categories: solvers and cost functions.

Solvers

In some embodiments there are three types of solvers:
1) A deformation solver: this solver can be used in block 510 to solve for all or some of the parameters of the deformable model described above, i.e. the rigid adjustment (rotation and translation), the blend shape weights and the per-vertex deltas.
2) A light rig solver: this solver can optimize the light rig parameters, for example:
   a. for the environment light: the exposure, the light color, the rotational transform, the Spherical Harmonics components;
   b. for the rectangular area light: the exposure, the light color, the rotational and translational transform, the width and height;
   c. for the directional light: the exposure, the light color, the rotational transform; and
   d. for the point light: the exposure, the light color, the translational transform (i.e. the position).
3) A material solver: this solver can be used to optimize for material parameters, for example, the per-vertex diffuse albedo color. In some embodiments it can also be the solver used to find out the specular parameters, e.g. roughness or intensity.

The goal of each solver is to find optimal values for its parameters (optimal being a function of what objectives are being solved). For all of these solvers, each solvable parameter can be locked or have its value bounded. It can be, for instance, useful to only use a subset of shapes when trying to get a first blocking of the deformation. Similarly, shapes can be sculpted for values in [0, 1] and it is therefore desirable to limit their value to be within these bounds. Additionally, while solvers often solve for parameters of a model for a single plate, some solvers can use images from multiple plates to arrive at a more accurate solution. For example, a material or light rig solver can resort to using multiple frames at the same time to get a more accurate estimation of material or light rig parameters. Also, various solvers can consider plates from a single camera (e.g., just the taking camera) or plates from multiple cameras (e.g., a taking and a witness cameras or multiple taking cameras).

Cost Functions

Cost functions can represent an objective that is desirable to reach. For example, an error that is desirable to minimize. Cost functions can be added to a solver and the solver will optimize its parameters in order to minimize the cost defined by the cost functions. Examples of cost functions according to various embodiments of the disclosure include:

Model-to-mesh per-vertex difference: This cost function computes the per-vertex point different between the deformable model and a target mesh.

Model-to-mesh per-edge difference: This cost function computes the per-edge vector difference between the deformable model and a target mesh.

Render-to-plate difference: This cost function computes the per-pixel difference between the plate and a render of the deformable model. In addition to the deformable model and the plate, this cost function requires the virtual camera, material and light rig as inputs.

Keyline-to-spline difference: Given a keyline (a 3D curve on the surface of the deformable model) and a 2D spline in image space, this cost function computes the difference between that spline and the 2D projection of the keyline (using the virtual camera to perform the projection).

Marker-to-embedding difference: Given a set of embeddings (3D points on the surface of the deformable model) and a set of corresponding 2D points in image space, this cost function computes the difference between the 2D projection of the embeddings and their 2D marker counterparts. The virtual camera is required to perform the embedding projections.

Frame-to-frame dense optical flow: Given the deformable model at a given frame, we create an embedding for each pixel of that frame on the mesh (using the virtual camera to perform inverse projection). Given a dense set of per-pixel optical flow vectors between this frame and another one, the cost function computes the difference between the projection of each embedding and its 2D target as defined by the optical flow vector.

Render-to-plate dense optical flow: Given the deformable model at a given frame (as well as the material, the light rig, the camera and the plate), this cost function produces a render of that model and computes a dense set of optical flow vectors between this render and the plate. Similarly to the previous cost function, this cost function then creates embeddings by inverse-projecting the image pixels onto the model and computes the distance between the projection of these embeddings and their target locations as defined by the optical flow vectors defined above.

Laplacian prior: The per-vertex difference between the Laplacian vector computed on the deformable model and that computed on a target mesh.

Albedo gradient: The per-edge difference between the vertex colors.

Basic priors: Any cost function computing the error as difference between a parameter's current value and initial value. For instance, the blendshape weights prior cost function computes the difference between current and initial values for the set of blend shape weights.

Ultimately, when combined with cost functions, a solver can find the parameter values that satisfy one or more desired objectives. For instance, a common solver used in the example recipes described below finds the deformation parameters.

Recipes

A recipe is a sequence of solvers, each with its own set of cost functions, laid out in a specific order. By running these solvers one after the other (each run over a series of iterations), embodiments can go from a neutral expression to the target expression on the plate. For example, referring to FIG. 5B, which is a simplified block diagram of an exemplary recipe that be executed in block 510, a particular recipe can include m "Solvers" (Solver 1, Solver 2, . . . . Solver M) where each "Solver" includes a specific set of cost functions such that the "Solver" will optimize its parameters in order to minimize the cost defined by the cost functions. For the recipe shown in FIG. 5B, Solver 1 will execute n1 iterations, then Solver 2 will execute n2 iterations, Solver 3 will execute n3 iterations and so on until Solver M executes its nm iterations. Each of the Solvers can have its cost functions and solvers have settings tweaked by artists in order to get the best possible result. A recipe can be designed to address a particular set of conditions typically met in shot productions. For instance, shots with low-frequency static illumination can use one recipe while shots with contrasted dynamic lighting can use a different recipe.

As an example of a recipe available to artists as a template, a recipe optimized for static illumination can include the following:

On the reference frame (i.e., a frame where the mesh matches the plate from the start), starting from the light rig measured on set and the albedo measured on the light stage, solve for a new light rig and albedo such that the render-to-plate difference is minimized. Subsequent solvers which require to produce a render of the deformable model can use this newly computed albedo and lighting to do so.

Solve for the blendshape weights and rigid head transform which minimize the error defined by the following cost functions: keyline-to-spline difference, marker-to-embedding difference, render-to-plate dense optical flow (also using a weights prior, a rigid prior and a Laplacian prior).

Solve for the blendshape weights which minimize the error defined by the following cost functions: render-to-plate difference, keyline-to-spline difference, marker-to-embedding difference (along with a weights prior and a Laplacian prior).

Solve for the per-vertex deltas which minimize the error defined by the following cost functions: render-to-plate difference (along with a Laplacian prior).

Solve for the blendshape weights, the rigid head transform and the pervertex deltas which minimize the error defined by the following cost functions: render-to-plate dense optical flow, keyline-to-spline difference, marker-to-embedding difference (along with a weights prior, a rigid prior and a Laplacian prior).

If the motion is fast and causes motion blur in the taking camera, embodiments can apply the same recipe to IR footage as a pre-pass to a final refinement on the taking camera. If the face is relatively large within a given frame, embodiments can also use the frame-to-frame dense flow cost function to solve for subtle deformations. For missing details and to improve temporal coherence, embodiments can pick "key frames" out of the current result (i.e., frames that are a good match) and use the frame-to-frame dense flow cost function to drive deformation capturing the missing details.

As another example of a recipe available to artists as a template, a recipe optimized for dynamic illumination can do the following:

Using any or all of rotoscoping splines, markers and IR, the recipe can solve for an approximate facial deformation.

Using that approximate facial deformation, the recipe can then solve for a per-frame material and lighting.

Using the per-frame material and lighting in lieu of the global ones, the recipe optimized for dynamic illumination can then use the same sequence of solvers discussed above with respect to static illumination to solve for a more accurate facial deformation.

Outputs

The final result of the solve in block 510 can be a final facial mesh obtained from a deformable model (block 520) that includes:
1) A rotation and translation value per frame (i.e., a rigid adjustment of the head);
2) A value for the weight vector $[w_0, w_1, \ldots, w_m]^T$ per frame (i.e., the weights of the various blendshapes that are used to calculate the expression); and
3) A value for the delta vector $[\delta(0), \delta(1), \ldots \delta(n)]^T$ per frame (i.e., a per vertex displacement used in transferring the facial expression of the actor to an animated character whose head can be larger or smaller and differently shaped than that of the actor).

Solving a large portion of the expression through shape weights is convenient for editing and retargeting (the transfer of the expression from the actor's model to a secondary model, like that of a creature for instance).

Example Computer Generated Imagery System

Figure 6:
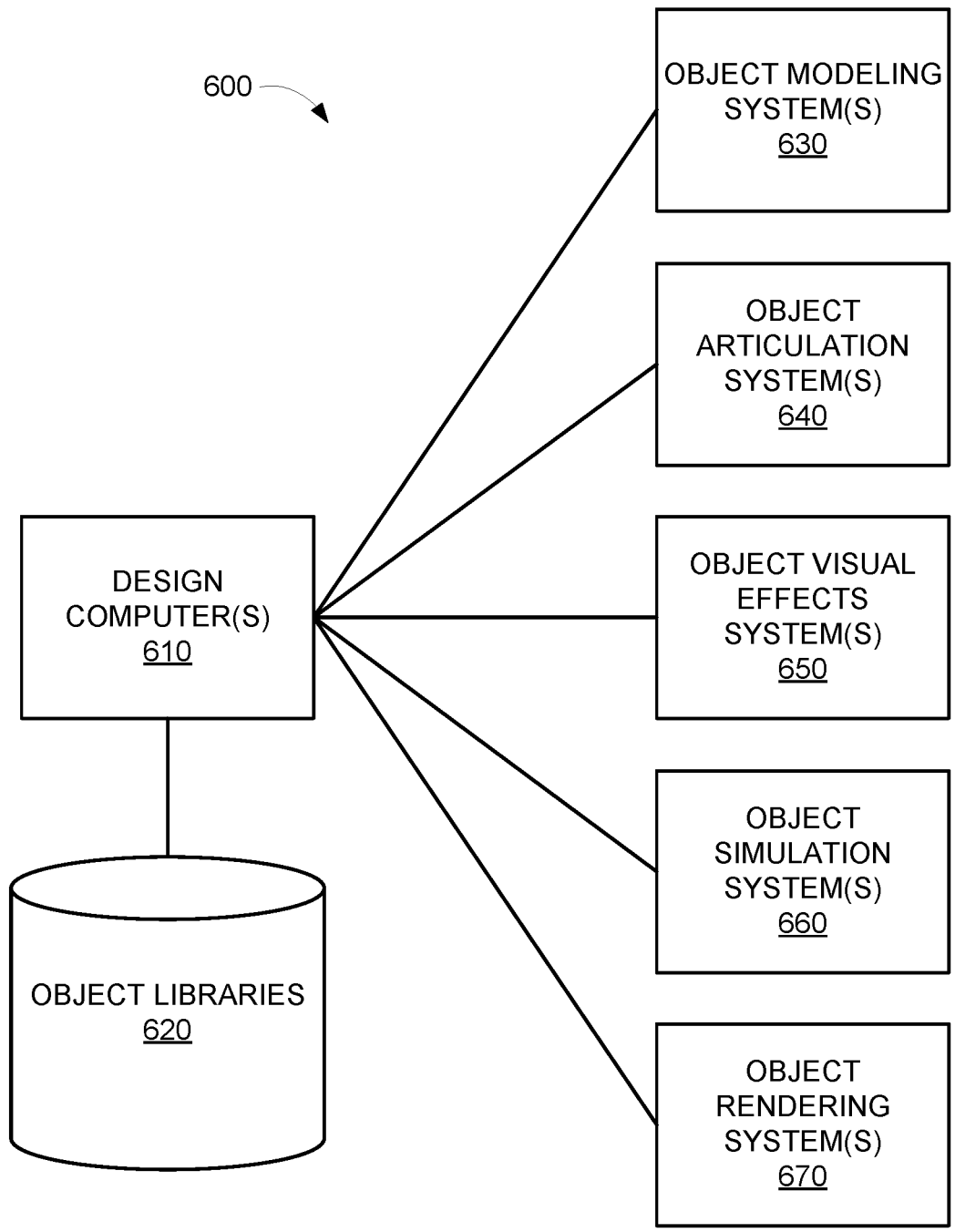
FIG. 6 is a simplified block diagram of system for creating computer generated imagery (CGI) and computer-aided animation that can implement or incorporate various embodiments in accordance with the disclosure.

FIG. 6 is a simplified block diagram of system 600 for creating computer generated imagery (CGI) and computer-aided animation that can implement or incorporate various embodiments in accordance with the disclosure. In this example, system 600 can include one or more design computers 610, object library 620, one or more object modeler systems 630, one or more object articulation systems 640, one or more object visual effects systems 650, one or more object simulation systems 660, and one or more object rendering systems 670. Any of the systems 630-670 may be invoked by or used directly by a user of the one or more design computers 610 and/or automatically invoked by or used by one or more processes associated with the one or more design computers 610. Any of the elements of system 600 can include hardware and/or software elements configured for specific functions.

The one or more design computers 610 can include hardware and software elements configured for designing CGI and assisting with computer-aided animation. Each of the one or more design computers 610 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 610 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 610 acting as a modeler may employ one or more systems or tools to design, create, or modify objects within a computer-generated scene. The modeler may use modeling software to sculpt and refine a 3D model to fit predefined aesthetic needs of one or more character designers. The modeler may design and maintain a modeling topology conducive to a storyboarded range of deformations. In another example, a user of the one or more design computers 610 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 610 acting as an animator may employ one or more systems or tools to specify motion and position of one or more objects over time to produce an animation.

Object library 620 can include elements configured for storing and accessing information related to objects used by the one or more design computers 610 during the various stages of a production process to produce CGI and animation. Some examples of object library 620 can include a file, a database, or other storage devices and mechanisms. Object library 620 may be locally accessible to the one or more design computers 610 or hosted by one or more external computer systems.

Some examples of information stored in object library 620 can include an object itself, metadata, object geometry, object topology, rigging, control data, animation data, animation cues, simulation data, texture data, lighting data, shader code, or the like. Object library 620 can also store one or more recipes used in FIG. 5, block 510 (as well as the various building blocks for the recipes, i.e., solvers and cost functions that can be used in each recipe or in future recipes) that a programmer may develop as part of a toolset to solve for facial expression transfer under different conditions. An object stored in object library 620 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 630 can include hardware and/or software elements configured for modeling one or more objects. Modeling can include the creating, sculpting, and editing of an object. In various embodiments, the one or more object modeling systems 630 may be configured to generated a model to include a description of the shape of an object. The one or more object modeling systems 630 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 630 may further generate model data (e.g., 2D and 3D model data) for use by other elements of system 600 or that can be stored in object library 620. The one or more object modeling systems 630 may be configured to allow a user to associate additional information, metadata, color, lighting, rigging, controls, or the like, with all or a portion of the generated model data.

The one or more object articulation systems 640 can include hardware and/or software elements configured to articulating one or more computer-generated objects. Articulation can include the building or creation of rigs, the rigging of an object, and the editing of rigging. In various embodiments, the one or more articulation systems 640 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 640 may further generate articulation data (e.g., data associated with controls or animations variables) for use by other elements of system 600 or that can be stored in object library 620. The one or more object articulation systems 640 may be configured to allow a user to associate additional information, metadata, color, lighting, rigging, controls, or the like, with all or a portion of the generated articulation data.

The one or more object visual effects systems 650 can include hardware and/or software elements configured for animating one or more computer-generated objects. Animation can include the specification of motion and position of an object over time. The one or more object visual effects systems 650 may be invoked by or used directly by a user of the one or more design computers 610 and/or automatically invoked by or used by one or more processes associated with the one or more design computers 610.

In various embodiments, the one or more visual effects systems 650 may be configured to enable users to manipulate controls or animation variables or utilized character rigging to specify one or more key frames of animation sequence. The one or more visual effects systems 650 generate intermediary frames based on the one or more key frames. In some embodiments, the one or more visual effects systems 650 may be configured to enable users to specify animation cues, paths, or the like according to one or more predefined sequences. The one or more visual effects systems 650 generate frames of the animation based on the animation cues or paths. In further embodiments, the one or more visual effects systems 650 may be configured to enable users to define animations using one or more animation languages, morphs, deformations, or the like. In various embodiments, the one or more visual effects systems 650 may be configured to generate animated content utilizing captured images from taking and witness cameras of any of the motion capture systems discussed herein.

The one or more object visual effects systems 650 may further generate animation data (e.g., inputs associated with controls or animations variables) for use by other elements of system 600 or that can be stored in object library 620. The one or more object visual effects systems 650 may be configured to allow a user to associate additional information, metadata, color, lighting, rigging, controls, or the like, with all or a portion of the generated animation data.

The one or more object simulation systems 660 can include hardware and/or software elements configured for simulating one or more computer-generated objects. Simulation can include determining motion and position of an object over time in response to one or more simulated forces or conditions. The one or more object simulation systems 660 may be invoked by or used directly by a user of the one or more design computers 610 and/or automatically invoked by or used by one or more processes associated with the one or more design computers 610.

In various embodiments, the one or more object simulation systems 660 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 660 may be used to simulate the behavior of objects, such as hair, fur, and cloth, in response to a physics model and/or animation of one or more characters and objects within a computer-generated scene.

The one or more object simulation systems 660 may further generate simulation data (e.g., motion and position of an object over time) for use by other elements of system 600 or that can be stored in object library 620. The generated simulation data may be combined with or used in addition to animation data generated by the one or more object visual effects systems 650. The one or more object simulation systems 660 may be configured to allow a user to associate additional information, metadata, color, lighting, rigging, controls, or the like, with all or a portion of the generated simulation data.

The one or more object rendering systems 670 can be differentiable renderers and can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 670 may be invoked by or used directly by a user of the one or more design computers 610 and/or automatically invoked by or used by one or more processes associated with the one or more design computers 610. One example of a software program embodied as the one or more object rendering systems 670 can include PhotoRealistic RenderMan, or PRMan, produced by Pixar Animations Studios of Emeryville, Calif.

In various embodiments, the one or more object rendering systems 670 can be configured to render one or more objects to produce one or more computer-generated images or a set of images over time that provide an animation. The one or more object rendering systems 670 may generate digital images or raster graphics images.

In various embodiments, a rendered image can be understood in terms of a number of visible features. Some examples of visible features that may be considered by the one or more object rendering systems 670 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlight rays on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 670 may further render images (e.g., motion and position of an object over time) for use by other elements of system 600 or that can be stored in object library 620. The one or more object rendering systems 670 may be configured to allow a user to associate additional information or metadata with all or a portion of the rendered image.

Example Computer System

Figure 7:
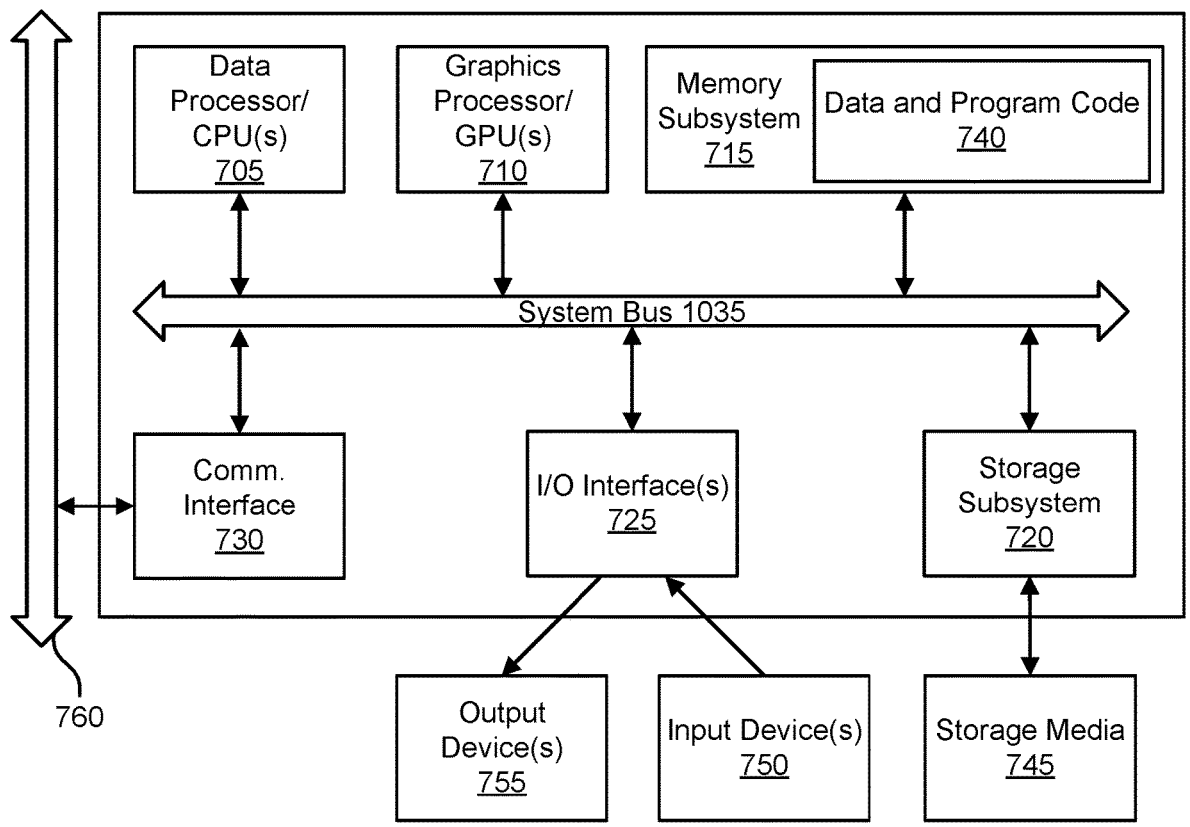
FIG. 7 is a block diagram of an exemplary computer system according to some embodiments of the invention.

FIG. 7 is a block diagram of an exemplary computer system 700 according to some embodiments of the invention. FIG. 7 is merely illustrative. In some embodiments, a computer system includes a single computer apparatus, where the subsystems can be the components of the computer apparatus. In other embodiments, a computer system can include multiple computer apparatuses, each being a subsystem, with internal components. Computer system 700 and any of its components or subsystems can include hardware and/or software elements configured for performing methods described herein.

Computer system 700 may include familiar computer components, such as one or more one or more data processors or central processing units (CPUs) 705, one or more graphics processors or graphical processing units (GPUs) 710, memory subsystem 715, storage subsystem 720, one or more input/output (I/O) interfaces 725, communications interface 730, or the like. Computer system 700 can include system bus 735 interconnecting the above components and providing functionality, such connectivity and inter-device communication.

The one or more data processors or central processing units (CPUs) 705 can execute logic or program code or for providing application-specific functionality. Some examples of CPU(s) 705 can include one or more microprocessors (e.g., single core and multi-core) or micro-controllers, one or more field-gate programmable arrays (FPGAs), and application-specific integrated circuits (ASICs). As used herein, a processor includes a multi-core processor on a same integrated chip, or multiple processing units on a single circuit board or networked.

The one or more graphics processor or graphical processing units (GPUs) 710 can execute logic or program code associated with graphics or for providing graphics-specific functionality. GPUs 710 may include any conventional graphics processing unit, such as those provided by conventional video cards. In various embodiments, GPUs 710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 710 may include any number of registers, logic units, arithmetic units, caches, memory interfaces, or the like.

Memory subsystem 715 can store information, e.g., using machine-readable articles, information storage devices, or computer-readable storage media. Some examples can include random access memories (RAM), read-only-memories (ROMS), volatile memories, non-volatile memories, and other semiconductor memories. Memory subsystem 715 can include data and program code 740.

Storage subsystem 720 can also store information using machine-readable articles, information storage devices, or computer-readable storage media. Storage subsystem 720 may store information using storage media 745. Some examples of storage media 745 used by storage subsystem 720 can include floppy disks, hard disks, optical storage media such as CD-ROMS, DVDs and bar codes, removable storage devices, networked storage devices, or the like. In some embodiments, all or part of data and program code 740 may be stored using storage subsystem 720.

The one or more input/output (I/O) interfaces 725 can perform I/O operations. One or more input devices 750 and/or one or more output devices 755 may be communicatively coupled to the one or more I/O interfaces 725. The one or more input devices 750 can receive information from one or more sources for computer system 700. Some examples of the one or more input devices 750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 750 may allow a user of computer system 700 to interact with one or more non-graphical or graphical user interfaces to enter a comment, select objects, icons, text, user interface widgets, or other user interface elements that appear on a monitor/display device via a command, a click of a button, or the like.

The one or more output devices 755 can output information to one or more destinations for computer system 700. Some examples of the one or more output devices 755 can include a printer, a fax, a feedback device for a mouse or joystick, external storage systems, a monitor or other display device, a communications interface appropriately configured as a transceiver, or the like. The one or more output devices 755 may allow a user of computer system 700 to view objects, icons, text, user interface widgets, or other user interface elements. A display device or monitor may be used with computer system 700 and can include hardware and/or software elements configured for displaying information.

Communications interface 730 can perform communications operations, including sending and receiving data. Some examples of communications interface 730 may include a network communications interface (e.g. Ethernet, Wi-Fi, etc.). For example, communications interface 730 may be coupled to communications network/external bus 760, such as a computer network, a USB hub, or the like. A computer system can include a plurality of the same components or subsystems, e.g., connected together by communications interface 730 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

Computer system 700 may also include one or more applications (e.g., software components or functions) to be executed by a processor to execute, perform, or otherwise implement techniques disclosed herein. These applications may be embodied as data and program code 740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 715 and/or storage subsystem 720.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of explanation, numerous specific details have been set forth in order to provide a thorough understanding of various embodiments of the present invention. It will be apparent, however, to one skilled in the art that embodiments of the present invention may be practiced without some of these specific details. In other instances, well-known structures and devices may have been shown in block diagram form.

This description has provided exemplary embodiments only, and is not intended to limit the scope, applicability, or configuration of the disclosure. Rather, this description of the exemplary embodiments provides those skilled in the art with an enabling description for implementing an exemplary embodiment. It should be understood that various changes may be made in the function and arrangement of elements without departing from the spirit and scope of the invention as set forth in the appended claims.

Specific details have been given in the description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "non-transitory, computer-readable medium" includes, but is not limited to portable or fixed storage devices, optical storage devices, and various other mediums capable of storing instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Additionally, for the purposes of illustration, methods may have been described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods.

These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although the disclosure has been described with respect to specific embodiments, it will be appreciated that the disclosure is intended to cover all modifications and equivalents within the scope of the following claims.

What is claimed is:

1. A method of transferring a facial expression from a subject to a computer generated character, the method comprising:
   receiving a plate with an image of the facial expression of the subject where the plate comprises more than a million pixels with each pixel having a particular RGB value, a three-dimensional parameterized deformable model of a face of the subject where different facial expressions of the subject can be obtained by varying values of model parameters, a model of a camera rig used to capture the plate, and a virtual lighting model that estimates lighting conditions when the image of the plate was captured;
   solving for the facial expression in the plate by executing a deformation solver to solve for at least some parameters of the three-dimensional parameterized deformable model with a differentiable renderer and shape from shading techniques, using, as inputs, the three-dimensional parameterized deformable model, the model of the camera rig and the virtual lighting model over a series of iterations to infer geometry of the facial expression in the plate and generate a final facial mesh using a set of parameter values of the three-dimensional parameterized deformable model which result in a final facial expression that closely matches the facial expression of the subject in the plate; and
   wherein, during each iteration of the series of iterations, the differentiable renderer generates a rendering of the three-dimensional parameterized deformable model and the deformation solver minimizes differences between RGB values of the plate and RGB values of corresponding pixels in the rendered version of the three-dimensional parameterized deformable model.

2. The method of claim 1, wherein, the three-dimensional parameterized deformable model comprises a plurality of blendshapes representing different facial expressions of the subject and wherein, the set of parameter values of the three-dimensional parameterized deformable model for the final facial mesh comprises a set of blendshape weight values, one blendshape weight value per each blendshape.

3. The method of claim 2, wherein the set of parameter values of the three-dimensional parameterized deformable model for the final facial mesh further comprises rotation and translation values that represent a rigid adjustment of a head of the subject.

4. The method of claim 3, wherein, the computer-generated character includes a head that is sized or shaped differently than the head of the subject and the set of parameter values of the three-dimensional parameterized deformable model for the final facial mesh further comprises a value for a delta vector that represents a per vertex displacement used in transferring the facial expression of the subject to the computer-generated character.

5. The method of claim 2, further comprising, generating a visual effect from a set of weighted blendshapes and incorporating the visual effect into one or more of an animation, a movie, a video, a video game, or virtual or augmented reality content.

6. The method of claim 1, wherein, an initial iteration of the solving for the facial expression in the plate comprises:
   rendering an initial facial mesh, generated from the three-dimensional parameterized deformable model, representing a neutral expression of the subject;
   trying to minimize differences between the RGB values of the plate and RGB values of the rendered initial facial mesh representing the neutral expression; and
   generating an updated facial mesh in which the facial expression of the subject more closely matches the facial expression of the subject in the plate than does the neutral expression of the initial facial mesh.

7. The method of claim 6, wherein, for each iteration of the solving step, an output of current iteration is closer to an actual representation of the subject in the plate than an output of the previous iteration.

8. The method of claim 6, wherein, solving for the facial expression in the plate includes executing a plurality of different deformation solvers, wherein each deformation solver executes a plurality of iterations before next solver is executed and wherein each deformation solver has at least one cost function associated with it that defines an objective that a respective deformation solver tries to minimize when executing the respective deformation solver.

9. The method of claim 8, wherein, the plurality of different deformation solvers are executed in a predetermined sequence that is defined by a recipe selected from a plurality of predetermined recipes stored in a library.

10. The method of claim 9, wherein, each predetermined recipe in the plurality of predetermined recipes includes one or more deformation solvers, each of which has at least one cost function associated with it.

11. The method of claim 1, wherein, the model of the camera rig is match-moved and models a taking camera and at least one witness camera mounted on the same camera rig.

12. The method of claim 11, wherein, the image of the facial expression of the subject includes a small set of markers placed on rigid portions of the face of the subject.

13. The method of claim 12, wherein, data representing positions of the set of markers are used during the solving step for determining rotation and translation of a skull of the subject.

14. The method of claim 1, wherein, the plate is captured from cameras mounted on a rig within a performance area separate from the subject.

15. The method of claim 1, wherein, the three-dimensional parameterized deformable model includes rotational and translations joints in addition to blendshapes.

16. A method of transferring a facial expression from a subject during a performance to a computer generated character, the method comprising:
   obtaining digital video footage of the performance including a plurality of sequentially ordered plates, each of which includes an image of the facial expression of the subject during the performance and comprises more than a million pixels with each pixel having a particular RGB value;
   obtaining a three-dimensional parameterized deformable model of a face of the subject where different facial expressions of the subject can be obtained by varying the values of model parameters, a model of a camera rig used to capture the performance, and a virtual lighting model that estimates lighting conditions used during the performance;

generating a computer model of the performance by, for each individual plate in the plurality of sequentially ordered plates, processing a respective individual plate independently of other plates in the plurality of sequentially ordered plates to solve for the facial expression in the respective plate with a differential renderer and shape from shading techniques, using, as inputs, the three-dimensional parameterized deformable model, the model of the camera rig and the virtual lighting model over a series of iterations to infer geometry of the facial expression in the respective plate and generate a final facial mesh using a set of parameter values for the three-dimensional parameterized deformable model which result in a final facial expression that closely matches the facial expression of the subject in the respective plate being processed; and wherein, during each iteration of the series of iterations, the differentiable renderer generates a rendering of the three-dimensional parameterized deformable model and the deformation solver minimizes differences between RGB values of the respective plate and RGB values of corresponding pixels in the rendered version of the three-dimensional parameterized deformable model.

17. The method of claim 16, wherein, the three-dimensional parameterized deformable model comprises a plurality of blendshapes representing different facial expressions of the subject and wherein, the set of parameter values comprises a set of blendshape weight values, one blendshape weight value per each blendshape.

18. The method of claim 17, wherein, the set of parameter values further comprises rotation and translation values that represent a rigid adjustment of a head of the subject.

19. The method of claim 18, wherein an initial iteration of the solving for the facial expression in the respective plate comprises: (i) rendering an initial facial mesh, generated from the three-dimensional parameterized deformable model, representing a neutral expression of the subject; (ii) trying to minimize differences between the RGB values of the respective plate and RGB values of the rendered initial facial mesh representing the neutral expression; and (iii) generating an updated facial mesh in which the facial expression of the subject more closely matches the facial expression of the subject in the respective plate than does the neutral expression of the initial facial mesh; and wherein, for each additional iteration of the solving step, an output of current iteration is closer to an actual representation of the subject in the respective plate than an output of the previous iteration.

* * * * *